(12) United States Patent
Ryu et al.

(10) Patent No.: US 9,438,948 B1
(45) Date of Patent: *Sep. 6, 2016

(54) AVN SYSTEM HAVING FUNCTION OF ANALYZING MIRRORING DATA AND METHOD OF CONTROLLING MIRRORING DATA

(71) Applicant: TINNOS INC., Seoul (KR)

(72) Inventors: Han Min Ryu, Yongin-si (KR); Dong Yup Lee, Bucheon-si (KR)

(73) Assignee: TINNOS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/708,179

(22) Filed: May 8, 2015

(30) Foreign Application Priority Data

Apr. 2, 2015 (JP) .................................. 2015-075770

(51) Int. Cl.
| | | |
|---|---|---|
| H04N 21/414 | (2011.01) |
| G01C 21/26 | (2006.01) |
| H04N 7/16 | (2011.01) |
| H04N 21/454 | (2011.01) |
| B60R 11/02 | (2006.01) |
| H04N 21/41 | (2011.01) |

(52) U.S. Cl.
CPC ..... *H04N 21/41422* (2013.01); *B60R 11/0235* (2013.01); *B60R 11/0258* (2013.01); *G01C 21/26* (2013.01); *H04N 7/162* (2013.01); *H04N 21/4122* (2013.01); *H04N 21/4126* (2013.01); *H04N 21/41407* (2013.01); *H04N 21/454* (2013.01); *B60R 2011/0294* (2013.01)

(58) Field of Classification Search
None
See application file for complete search history.

(56) References Cited

FOREIGN PATENT DOCUMENTS

| JP | 2004080252 A | 3/2004 |
| JP | 2006235325 A | 9/2006 |
| JP | 2006251310 A | 9/2006 |
| KR | 1020130131209 A | 12/2013 |
| WO | 2012127809 A1 | 9/2012 |

*Primary Examiner* — John R Olszewski
*Assistant Examiner* — Gerrad A Foster
(74) *Attorney, Agent, or Firm* — Hauptman Ham, LLP

(57) ABSTRACT

An AVN system of a vehicle includes a processor including a receiving unit that receives driving information of the vehicle, and receives mirroring data from an external wireless terminal through a wireless communication, a determining unit that determines whether or not the vehicle is moving, based on the driving information, and determines a type of the mirroring data, whether the mirroring data are movie data or non-movie data, a control unit that, upon the determining unit determining that the vehicle is not moving, outputs the mirroring data as they are regardless of the type of the mirroring data, and upon the determining unit determining that the vehicle is moving, outputs the mirroring data as they are only when the mirroring data are the non-movie data, and an output unit that outputs the mirroring data to a display device.

16 Claims, 2 Drawing Sheets

AVN SYSTEM HAVING FUNCTION OF ANALYZING MIRRORING DATA AND METHOD OF CONTROLLING MIRRORING DATA

CROSS-REFERENCE TO RELATED APPLICATIONS

This application claims the benefit of Japanese Patent Application No. 2015-075770 filed with the Japanese Patent Office on Apr. 2, 2015, the full disclosure of which is incorporated herein by reference.

BACKGROUND

1. Field

The present disclosure relates to an AVN (Audio, Video, and Navigation) system having a function of analyzing mirroring data and a method of controlling the mirroring data, and more particularly, to an AVN system having a function of analyzing mirroring data received from a wireless terminal and outputting the mirroring data to a display device when the mirroring data are non-movie data under a predetermined condition and a method of controlling the mirroring data. The AVN system refers to an in-vehicle system providing audio function, video function, and navigation function. The audio function refers to a function of outputting audio contents such as music. The video function refers to a function of outputting video contents such as movie. The navigation function refers to a function of providing driving information including a map and a route to a destination, such as a car navigation. The mirroring data include audio data, still image data, and movie data that can be played in the AVN system in the same manner as that in the wireless terminal.

2. Description of the Related Art

An introduction of an AVN system to a vehicle, which can play various multimedia contents, enabled driver and passenger(s) to watch movie contents such as film and broadcast in a vehicle.

Such AVN system offers a navigation function as well as the function of playing various multimedia contents. In recent years, the navigation function has become one of the main functions in the AVN system.

Although the navigation function is performed in the in-vehicle AVN system, in recent years, a navigation function of a mobile device has also become widely used. As the mobile device constantly provides a timely update of navigation data with information reflecting real-time traffic conditions, in some cases, the navigation function of the mobile device is more efficient to use.

In order to make full use of such merits, a mirroring service that allows an operation of the mobile device to be used in the same manner in the AVN system of the vehicle has been developed, so that the navigation function of the mobile device can be used on the AVN system. The mirroring refers to a process of displaying contents, which are displayed on a terminal such as a mobile device, on a display device of other system such as the AVN system of a vehicle, and in a broader meaning, further refers to a process of operating functions of the terminal through the display device of the other system.

Korean Patent Application Laid-Open No. 10-2013-0131209 describes an apparatus for using functions of a mobile device in a system of a vehicle. This apparatus allows movie contents played on the mobile device to be displayed on an AVN system of the vehicle.

However, watching a movie while driving may lower the power of concentration of a driver, which sometimes occupies one of the main causes of a traffic accident. For this reason, most auto companies basically adopt a so-called "drive control" to prohibit the movie contents from being played while driving on their genuine in-vehicle AVN systems.

If the mirroring service is provided on the AVN system without such drive control, the movie contents played on the mobile device are played on the AVN system without filtering, which allows the movie to be displayed on the AVN system while driving, possibly causing a trouble in terms of the safety.

In order to use the mirroring service on an AVN system, as a drive control method, when the mirroring data contain movie contents, the wireless terminal notifies the AVN system of the fact that the contents of the mirroring data are movie contents, through a separate Bluetooth™ connection between the wireless terminal and the AVN system. However, in this case, system resources of the AVN system including the Bluetooth™ are consumed.

SUMMARY

An AVN system according to some embodiments includes a processor including a receiving unit configured to receive driving information of the vehicle from the vehicle, and to receive mirroring data from an external wireless terminal through a wireless communication, a determining unit configured to determine whether or not the vehicle is moving, based on the driving information, and to determine a type of the mirroring data, whether the mirroring data are movie data or non-movie data, a control unit configured, upon the determining unit determining that the vehicle is not moving, to output the mirroring data as they are regardless of the type of the mirroring data, and upon the determining unit determining that the vehicle is moving, to output the mirroring data as they are only when the mirroring data are the non-movie data, and an output unit configured to output the mirroring data to a display device. The determining unit is configured to detect an amount of change of the mirroring data per unit time, to compare the amount of change of the mirroring data per unit time with a predetermined threshold value, and to determine that the mirroring data are movie data when the amount of change of the mirroring data is larger than the threshold value.

A method of controlling mirroring data in an AVN system according to some embodiments includes receiving driving information of the vehicle from the vehicle, receiving mirroring data from an external wireless terminal through a wireless communication, determining whether or not the vehicle is moving, based on the driving information, determining a type of the mirroring data, whether the mirroring data are movie data or non-movie data, controlling including when the vehicle is not moving, outputting the mirroring data as they are regardless of the type of the mirroring data, and when the vehicle is moving, outputting the mirroring data as they are only when the mirroring data are the non-movie data, and outputting the mirroring data to a display device. The determining includes detecting an amount of change of the mirroring data per unit time, comparing the amount of change of the mirroring data per unit time with a predetermined threshold value, and determining that the mirroring data are movie data when the amount of change of the mirroring data is larger than the threshold value.

The above and other objects, features, advantages and technical and industrial significance of this disclosure will be better understood by reading the following detailed description of exemplary embodiments of the disclosure, when considered in connection with the accompanying drawings.

DETAILED DESCRIPTION OF THE PREFERRED EMBODIMENTS

Exemplary embodiments of the present disclosure are described in detail below with reference to the accompanying drawings.

Figure 1:
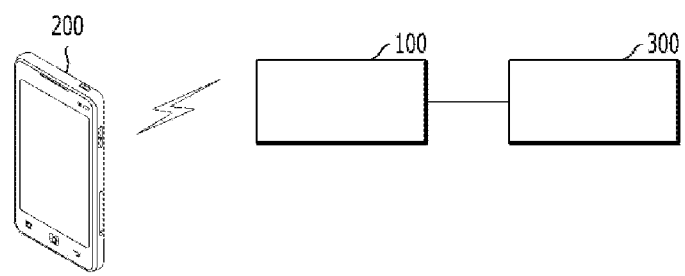
FIG. 1 is a schematic diagram for illustrating an operation of an AVN system according to some embodiments.

FIG. 1 is a schematic diagram of an operation of an AVN system 100 according to some embodiments.

The AVN (Audio, Video, and Navigation) system 100 according to some embodiments receives mirroring data from a wireless terminal 200, and outputs the received mirroring data to the display device 300. Specifically, the AVN system 100 analyzes driving information received from the vehicle and the mirroring data received from the wireless terminal 200, determines whether or not the vehicle is moving based on the driving information, and determines a type of the mirroring data, whether the mirroring data are movie data or non-movie data. When the vehicle is moving, the AVN system 100 outputs the mirroring data as they are (without filtering) to the display device 300 when the mirroring data are non-movie data. The AVN system 100 is a so-called "infotainment system" including audio function, video function, and navigation function, and the wireless terminal 200 is a wireless device capable of transmitting contents of the terminal as mirror data (miracast), such as a smartphone. The non-movie data include navigation data, map data, image data, audio data, and the like.

That is, when performing a mirroring service, the AVN system 100 according to some embodiments prohibits movie contents played on the wireless terminal 200 from being mirrored as they are on the display device 300 when the vehicle is moving. In this case, the AVN system 100 controls the mirroring data to be mirrored as they are on the display device 300 only when the mirroring data are non-movie data.

Figure 2:
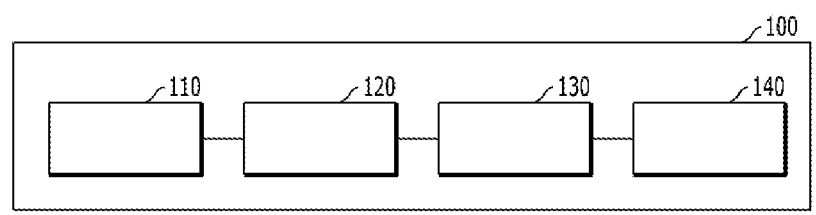
FIG. 2 is a block diagram of the AVN system according to some embodiments.

FIG. 2 is a block diagram of the AVN system 100 according to some embodiments.

The AVN system 100 according to some embodiments includes a receiving unit 110, a determining unit 120, a control unit 130, and an output unit 140. In some embodiments, the AVN system 100 includes a processor (not shown) such as a central processing unit (CPU), and the receiving unit 110, the determining unit 120, the control unit 130, and the output unit 140 are implemented in the processor as respective function modules.

The receiving unit 110 receives the mirroring data from the wireless terminal 200 by using at least one of communication methods including Bluetooth™, ultra wideband (UWB), and WiFi. To this end, the receiving unit 110 includes at least one of a Bluetooth communication module (not shown), a UWB communication module (not shown), or a WiFi communication module (not shown) depending on the communication method used.

The determining unit 120 analyzes the received mirroring data, and determines a type of the mirroring data, whether the mirroring data are movie data or non-movie data. Specifically, the determining unit 120 detects an amount of change of the received mirroring data per unit time, and determines the type of the mirroring data based on the detected amount of change of the mirroring data per unit time.

When the amount of change of the mirroring data per unit time is large, i.e., when a difference between the current data amount and the previous data amount is large, the determining unit 120 determines that the mirroring data are movie data. The movie data generally have a large change in the video portion, and hence it is possible to determine that the mirroring data are movie data, which have a large change in the video portion, when a match rate of the data has a large difference by comparing the current data with the previous data.

For example, when the match rate of the mirroring data is larger than a predetermined threshold value (i.e., a change rate is smaller than a predetermined threshold value), it is possible to determine that the mirroring data are non-movie data. In some embodiments, when the match rate of the mirroring data is smaller than 70% (or the change rate is larger than 30%), it is determined that the mirroring data are movie data, and when the match rate of the mirroring data is larger than 70% (or the change rate is smaller than 30%), it is determined that the mirroring data are non-movie data.

A method of analyzing the mirroring data is described in detail below with reference to FIGS. 3 and 4.

When the result of analyzing the mirroring data received from the wireless terminal 200 by the determining unit 120 shows that the mirroring data are non-movie data, the control unit 130 controls the mirroring data to be outputted as they are (without filtering) to the display device 300 through the output unit 140, and when the result of analyzing the mirroring data shows that the mirroring data are movie data, the control unit 130 controls the mirroring data not to be outputted as they are to the display device 300 depending on a driving status of the vehicle.

In some embodiments, when the vehicle is moving and the mirroring data are movie data, the control unit 130 controls a portion of the mirroring data, which corresponds to video data, to be filtered by a video filter (not shown) that filters video data, and only audio data to be outputted to the display device 300 through the output unit 140. To this end, the determining unit 120 separates the video data and the audio data from the mirroring data.

The AVN system 100 according to some embodiments receives the driving information from the vehicle, and determines whether or not the vehicle is moving based on the received driving information of the vehicle. When the vehicle is moving, the AVN system 100 further determines the type of the mirroring data. When the mirroring data are non-movie data, the AVN system 100 outputs the mirroring data as they are to the display device 300, and when the mirroring data are movie data, the AVN system 100 filters the video data and outputs only the audio data to the display device 300.

In some embodiments, when the vehicle is not moving, the control unit 130 disables the determining unit 120, such that the mirroring data received from the wireless terminal 200 are outputted as they are to the display device 300 through the output unit 140.

The output unit 140 is connected to the display device 300, and the mirroring data outputted to the display device 300 through the output unit 140 are displayed on a display unit of the display device 300.

Figure 3:
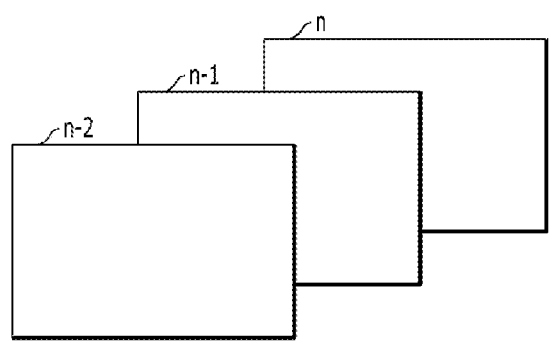
FIG. 3 is a schematic diagram for illustrating a method of analyzing mirroring data in the AVN system according to some embodiments.

FIG. 3 is a schematic diagram for illustrating a method of analyzing mirroring data in the AVN system 100 according to some embodiments.

The determining unit 120 stores the mirroring data received from the wireless terminal 200 in a memory (not shown) at predetermined time intervals, compares current data with previous data, and obtains a match rate (or amount of change) of the mirroring data.

For example, the determining unit 120 compares first data (current data) n with second data (previous data) n−1, and obtains the match rate (or amount of change) of the mirroring data, as illustrated in FIG. 3.

When the mirroring data are non-movie data such as image data or navigation data, there is little change in video or even when there is a change in the video, the amount of the change is not that large, so that the change of the data with time is negligible. On the other hand, when the mirroring data are movie data, there is a large change in the video (for example, brightness, edge of a specific image, or color), and hence the match rate is small (i.e., the amount of change of the data is large) due to the change of the data with time.

Therefore, when the result of comparing the first data n and the second data n−1 shows a small match rate (large amount of change), the determining unit 120 determines that the mirroring data are movie data.

Even when the mirroring data are movie data, if the mirroring data include still picture data, there is substantially little change of the data with time. Therefore, the comparison can be performed with, for example, three pieces of data that temporally differ from one another, such as current data, previous data, and further previous data.

Therefore, in some embodiments, three pieces of data including first data n, second data n−1, and third data n−2 are compared with one another, and when the match rate of the data is small (the amount of change of the data is large), it is determined that the mirroring data are movie data.

When the data to be compared are temporally adjacent to each other, in order to determine the match rate (or amount of change) of the data more precisely, the time intervals among the three pieces of data can be set differently. For example, the time interval between the first data n and the second data n−1 is set to a first time (for example 0.1 sec), while the time interval between the second data n−1 and the third data n−2 is set to a second time (for example, 1 sec). In this manner, by setting the time intervals between the pieces of data to different times, for example, the first time and the second time, the match rate of the data can be determined more precisely based on a difference between the match rates.

On the other hand, when the above-mentioned time interval is too large, even if the mirroring data are movie data, there may be a large difference between the match rates respectively corresponding to the time intervals. Therefore, considering the navigation data, for example, the time interval needs to be set to a value within a time range in which the navigation data corresponding to each time interval have similar data.

Therefore, the above-mentioned time interval is set to a time for which the match rate is small for the movie data and the match rate is large for the non-movie data such as the navigation data.

Figure 4:
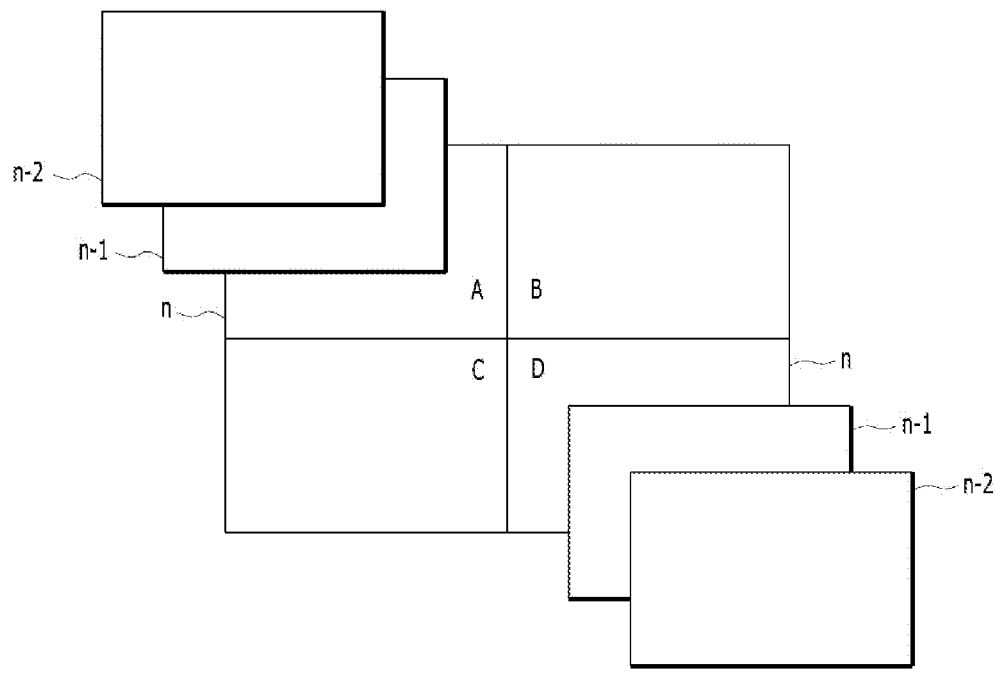
FIG. 4 is a schematic diagram for illustrating a method of analyzing mirroring data in the AVN system according to some embodiments, in which the mirroring data are divided into a plurality of areas.

FIG. 4 is a schematic diagram for illustrating a method of analyzing mirroring data in the AVN system 100 according to some embodiments, in which the mirroring data are divided into a plurality of areas.

In the example shown in FIG. 3, the mirroring data are divided on a time domain, and whole data of a predetermined time are compared with whole data of different time, to determine the match rate. However, using the whole data in the comparison may take time to analyze the data.

Therefore, in some embodiments, the mirroring data of each time are divided into a plurality of areas, a predetermined number of areas are selected from the plurality of areas, and only the data corresponding to the selected areas are used in the comparison to determine the match rate.

In the example shown in FIG. 4, the whole data are divided into four areas A, B, C, and D, two areas A and D are selected form the four areas, and the data corresponding to the selected areas A and D are used in the comparison to determine the match rate.

In this manner, by dividing the mirroring data into a plurality of areas, selecting a predetermined number of areas from the plurality of areas, and comparing only the data corresponding to the selected areas, it is possible to analyze the mirroring data and make a determination in a less time-consuming manner.

In some embodiments, the amount the mirroring data to be compared includes brightness, edge of a specific image, and color of video data obtained by separating video data and audio data from the mirroring data.

Figure 5:
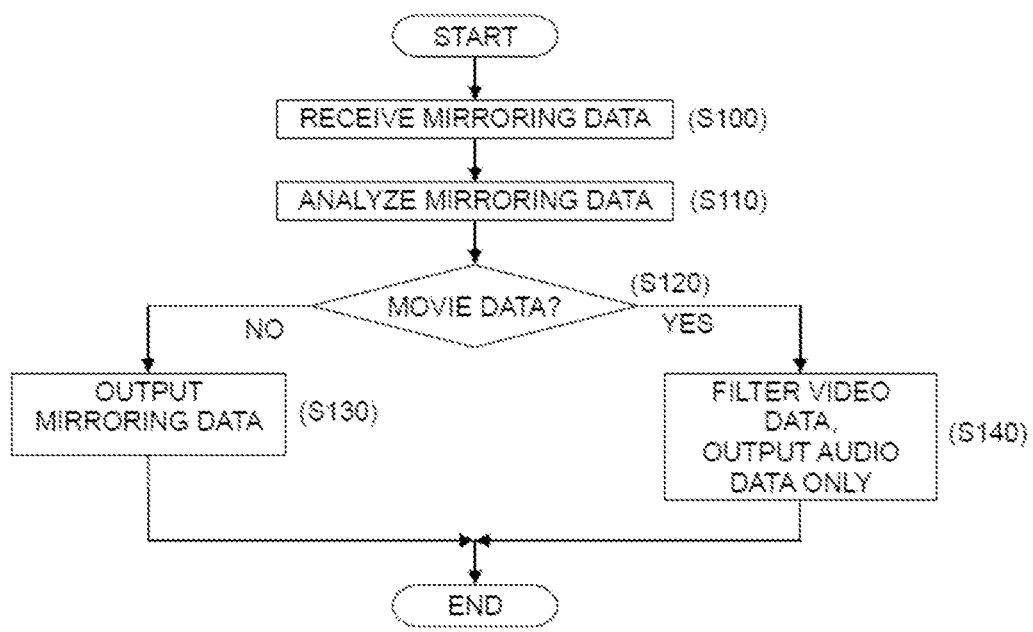
FIG. 5 is a flowchart of the method of analyzing the mirroring data in the AVN system according to some embodiments.

FIG. 5 is a flowchart of the method of analyzing the mirroring data in the AVN system 100 according to some embodiments.

At Step S100, the receiving unit 110 receives the mirroring data from the wireless terminal 200 through a wireless communication.

At Step S110, the determining unit 120 analyzes the received mirroring data.

The method of analyzing the mirroring data is substantially the same as the ones described with reference to FIGS. 3 and 4.

In some embodiments, before analyzing the mirroring data at Step S110, the determining unit 120 determines a driving status of the vehicle, whether or not the vehicle is moving, based on the driving information received from the vehicle. When the result of the determination indicates that the vehicle is moving, the determining unit 120 analyzes the mirroring data at Step S110.

At Step S120, the determining unit 120 determines a type of the mirroring data, whether the mirroring data are movie data or non-movie data, based on the result of the analysis at Step S110.

When the result of the determination at Step S120 is "NO", i.e., when the mirroring data are non-movie data, the control unit 130 outputs the mirroring data received from the wireless terminal 200 as they are (without filtering) to the display device 300 through the output unit 140 (Step S130).

When the result of the determination at Step S120 is "YES", i.e., when the mirroring data are movie data, the control unit 130 filters the video data from the mirroring data received from the wireless terminal 200 and outputs only the audio data to the display device 300 through the output unit 140.

As described above, the AVN system 100 and the method of controlling the mirroring-data according to some embodiments prohibits the movie contents from being watched while driving when using a mirroring service from the wireless terminal 200 such as a mobile device on the display device 300 of a vehicle.

In addition, the AVN system 100 and the method of controlling the mirroring-data according to some embodiments determines whether the mirroring data are movie data or non-movie data by analyzing the mirroring data at the AVN system 100 when applying the drive control, and hence the mirroring service can be provided without consuming the system resources of the display device 300 and without providing a device for notifying whether or not the contents are movie in the wireless terminal 200.

It is an object of the present disclosure to analyze mirroring data at an AVN system without consuming system resources of an AVN system of a vehicle and without providing a device for notifying whether or not the contents are movie in the wireless terminal, and when the mirroring data are movie data, blocks an output of the movie data to the display device when the vehicle is moving, thus preventing the power of concentration of a driver from being lowered.

The AVN system and the method of controlling the mirroring-data according to some embodiments prevents movie contents from being watched while driving when using a mirroring service from a wireless terminal such as a mobile device on an AVN system of a vehicle.

Further, the AVN system and the method of controlling the mirroring-data according to some embodiments determines whether the mirroring data are movie data or non-movie data by analyzing the mirroring data at the AVN system when applying the drive control, and hence the mirroring service can be provided without consuming the system resources of the AVN system and without providing a device for notifying whether or not the contents are movie in the wireless terminal.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An AVN (Audio, Video, and Navigation) system of a vehicle, configured to provide functions of audio, video, and navigation, the AVN system comprising:
   a processor including
      a receiving unit configured
         to receive driving information of the vehicle from the vehicle, and
         to receive mirroring data from an external wireless terminal through a wireless communication,
      a determining unit configured
         to determine whether or not the vehicle is moving, based on the driving information, and
         to determine a type of the mirroring data, wherein the type of the mirroring data is movie data or non-movie data,
      a control unit configured,
         upon the determining unit determining that the vehicle is not moving, to output the mirroring data to the AVN regardless of the type of the mirroring data, and
         upon the determining unit determining that the vehicle is moving, to output the mirroring data to the AVN only when the type of the mirroring data is the non-movie data, and
      an output unit configured to output the mirroring data to a display device, wherein the determining unit is configured
         to detect an amount of change of the mirroring data per unit time,
         to compare the amount of change of the mirroring data per unit time with a predetermined threshold value, and
         to determine that the mirroring data are movie data when the amount of change of the mirroring data is larger than the threshold value.

2. The AVN system according to claim 1, wherein the determining unit is configured
   to divide the mirroring data into a plurality of areas,
   to select a predetermined number of areas from the plurality of areas, and
   to determine the type of the mirroring data by using mirroring data corresponding to the selected areas.

3. The AVN system according to claim 1, wherein the determining unit is configured
   to separate video data and audio data from the mirroring data,
   to detect an amount of change of the video data per unit time,
   to compare the amount of change of the video data per unit time with the threshold value, and
   to determine that the type of the mirroring data is movie data when the amount of change of the video data is larger than the threshold value.

4. The AVN system according to claim 1, wherein the determining unit is configured
   to separate video data and audio data from the mirroring data,
   to perform an edge detection of an image of the video data,
   to detect an amount of change of a detected edge per unit time,
   to compare the amount of change of the detected edge per unit time with the threshold value, and
   to determine that the type of the mirroring data is movie data when the amount of change of the detected edge per unit time is larger than the threshold value.

5. The AVN system according to claim 1, wherein the determining unit is configured
   to separate video data and audio data from the mirroring data,
   to detect color of the video data,
   to detect an amount of change of a detected color per unit time,
   to compare the amount of change of the detected color per unit time with the threshold value, and
   to determine that the type of the mirroring data is movie data when the amount of change of the color per unit time is larger than the threshold value.

6. The AVN system according to claim 1, wherein the determining unit is configured
   to separate video data and audio data from the mirroring data, to detect brightness of the video data,
to detect an amount of change of a detected brightness per unit time,
to compare the amount of change of the detected brightness per unit time with the threshold value, and
to determine that the type of the mirroring data is movie data when the amount of change of the brightness per unit time is larger than the threshold value.

7. The AVN system according to claim 1, further comprising a video filter configured to filter video data, wherein when the vehicle is moving and the type of the mirroring data is movie data, the control unit is configured
to separate video data and audio data from the mirroring data,
to filter the video data by using the video filter, and
to output the audio data only to the AVN system through the interface unit.

8. The AVN system according to claim 1, wherein the non-movie data include navigation data.

9. A method of controlling mirroring data in an AVN (Audio, Video, and Navigation) system of a vehicle, configured to provide functions of audio, video, and navigation, the AVN system comprising a processor including a receiving unit, a determining unit, a control unit, and an output unit, the method comprising:
receiving, by the receiving unit, driving information of the vehicle from the vehicle;
receiving, by the receiving unit, mirroring data from an external wireless terminal through a wireless communication;
determining, by the determining unit, whether or not the vehicle is moving, based on the driving information;
determining, by the determining unit, a type of the mirroring data, wherein the type of the mirroring data is movie data or non-movie data;
controlling, by the control unit, including
when the vehicle is not moving, outputting the mirroring data to the AVN regardless of the type of the mirroring data, and
when the vehicle is moving, outputting the mirroring data to the AVN only when the type of the mirroring data is the non-movie data; and
outputting, by the output unit, the mirroring data to a display device, wherein
the determining includes
detecting an amount of change of the mirroring data per unit time,
comparing the amount of change of the mirroring data per unit time with a predetermined threshold value, and
determining that the mirroring data are movie data when the amount of change of the mirroring data is larger than the threshold value.

10. The method according to claim 9, wherein the determining includes
dividing the mirroring data into a plurality of areas,
selecting areas from the plurality of areas, and
determining the type of the mirroring data by using mirroring data corresponding to the selected areas.

11. The method according to claim 9, wherein the determining includes
separating video data and audio data from the mirroring data,
detecting an amount of change of the video data per unit time,
comparing the amount of change of the video data per unit time with the threshold value, and
determining that the type of the mirroring data is movie data when the amount of change of the video data is larger than the threshold value.

12. The method according to claim 9, wherein the determining includes
separating video data and audio data from the mirroring data,
performing an edge detection of an image of the video data,
detecting an amount of change of a detected edge per unit time,
comparing the amount of change of the detected edge per unit time with the threshold value, and
determining that the type of the mirroring data is movie data when the amount of change of the detected edge per unit time is larger than the threshold value.

13. The method according to claim 9, wherein the determining includes
separating video data and audio data from the mirroring data,
detecting color of the video data,
detecting an amount of change of a detected color per unit time,
comparing the amount of change of the detected color per unit time with the threshold value, and
determining that the type of the mirroring data is movie data when the amount of change of the color per unit time is larger than the threshold value.

14. The method according to claim 9, wherein the determining includes
separating video data and audio data from the mirroring data,
detecting brightness of the video data,
detecting an amount of change of a detected brightness per unit time,
comparing the amount of change of the detected brightness per unit time with the threshold value, and
determining that the type of the mirroring data is movie data when the amount of change of the brightness per unit time is larger than the threshold value.

15. The method according to claim 9, wherein when it is determined that the vehicle is moving and the type of the mirroring data is movie data at the determining, the controlling further includes
separating video data and audio data from the mirroring data,
filtering the video data by using a video filter configured to filter the video data, and
outputting the audio data only to the AVN system through the interface unit.

16. The method according to claim 9, wherein the non-movie data include navigation data.

* * * * *